United States Patent
Pan et al.

(10) Patent No.: US 8,605,389 B1
(45) Date of Patent: Dec. 10, 2013

(54) HEAD GIMBAL ASSEMBLY INCLUDING A CONDUCTIVE TRACE DISPOSED UPON A CONTINUOUS DIELECTRIC LAYER SEGMENT WITHOUT OVERLYING A GIMBAL ARM

(75) Inventors: Tzong-Shii Pan, San Jose, CA (US); David I. Berger, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1909 days.

(21) Appl. No.: 11/450,817

(22) Filed: Jun. 9, 2006

(51) Int. Cl.
G11B 5/48 (2006.01)

(52) U.S. Cl.
USPC ........................................ 360/245.9

(58) Field of Classification Search
None
See application file for complete search history.

(56) References Cited

U.S. PATENT DOCUMENTS

| | | | |
|---|---|---|---|
| 5,870,258 A | 2/1999 | Khan et al. | |
| 5,883,758 A | 3/1999 | Bennin et al. | |
| 5,956,212 A | 9/1999 | Zhu | |
| 6,249,404 B1* | 6/2001 | Doundakov et al. | 360/245.4 |
| 6,459,549 B1 | 10/2002 | Tsuchiya et al. | |
| 6,515,832 B1 | 2/2003 | Girard | |
| 6,965,499 B1 | 11/2005 | Zhang et al. | |
| 6,993,824 B2 | 2/2006 | Childers et al. | |
| 7,002,780 B2 | 2/2006 | Rancour et al. | |
| 7,113,372 B2 | 9/2006 | Segar et al. | |
| 7,403,357 B1 | 7/2008 | Williams | |
| 7,411,764 B2 | 8/2008 | Yang et al. | |
| 7,525,769 B2 | 4/2009 | Yao et al. | |
| 7,545,605 B2 | 6/2009 | Hagiya et al. | |
| 7,554,773 B2 | 6/2009 | Zhu et al. | |
| 7,567,410 B1 | 7/2009 | Zhang et al. | |
| 7,593,190 B1 | 9/2009 | Thornton et al. | |
| 7,663,843 B2 | 2/2010 | Yao | |
| 7,688,553 B1 | 3/2010 | Williams et al. | |
| 7,697,237 B1 | 4/2010 | Danielson | |
| 8,027,128 B2 | 9/2011 | Muraki et al. | |
| 8,130,470 B2 | 3/2012 | Muraki et al. | |
| 8,488,281 B1 | 7/2013 | Pan | |
| 2004/0226164 A1 | 11/2004 | Girard | |
| 2004/0246625 A1 | 12/2004 | Tsuchida et al. | |
| 2005/0117257 A1* | 6/2005 | Thaveeprungsriporn et al. | 360/246 |
| 2006/0262456 A1 | 11/2006 | Wang et al. | |
| 2008/0144223 A1 | 6/2008 | Muraki et al. | |
| 2008/0144225 A1 | 6/2008 | Yao et al. | |
| 2008/0180850 A1 | 7/2008 | Rice et al. | |
| 2009/0080116 A1 | 3/2009 | Takahashi et al. | |

* cited by examiner

Primary Examiner — Mark Blouin

(57) ABSTRACT

There is provided a head gimbal assembly (HGA) for a disk drive. The HGA includes a slider and a flexure. The flexure includes a flexure body portion, a tongue portion with the slider affixed to the tongue portion, first and second gimbal arms extending between the flexure body portion and the tongue portion, and a dielectric layer including a first dielectric layer segment extending continuously along the first gimbal arm between the flexure body portion and the tongue portion. The flexure further includes a first patterned conductive trace electrically connected to the slider. The first patterned conductive trace is supported by the first dielectric layer segment. The first dielectric layer segment crosses and re-crosses the first patterned conductive trace along the first gimbal arm without overlying the first gimbal arm.

9 Claims, 8 Drawing Sheets

HEAD GIMBAL ASSEMBLY INCLUDING A CONDUCTIVE TRACE DISPOSED UPON A CONTINUOUS DIELECTRIC LAYER SEGMENT WITHOUT OVERLYING A GIMBAL ARM

FIELD OF THE INVENTION

The present invention relates generally to disk drives, and in particular a head gimbal assembly including a flexure conductive trace disposed upon a continuous dielectric layer segment without overlying a gimbal arm.

BACKGROUND

The typical hard disk drive includes a head disk assembly (HDA) and a printed circuit board assembly (PCBA) attached to a disk drive base of the HDA. The HDA includes at least one disk, a spindle motor for rotating the disk, and a head stack assembly (HSA). The PCBA includes a disk controller for generating servo control signals. The HSA includes a head for reading and writing data from and to the disk. The HSA is controllably positioned in response to the generated servo control signals from the disk controller to move the head relative to tracks of the disk.

The HSA includes an actuator assembly, at least one head gimbal assembly (HGA), and a flex cable assembly. The actuator assembly typically includes an actuator having an actuator body with one or more actuator arms extending from the actuator body. Each actuator arm supports the HGA that includes a head. An actuator coil is supported by the actuator body. The actuator coil interacts with a magnet to form a voice coil motor. The PCBA controls current passing through the actuator coil that results in a torque being applied to the actuator. The HSA further includes the flex cable assembly in electrical communication with the PCBA. The flex cable assembly supplies current to the coil and carries signals between the head and the PCBA.

A flexure extends along the load beam and is considered a sub-component of the HGA. The head includes a slider and a transducer disposed on the slider. The head is attached and electrically connected to the flexure. The flexure includes a flexure tail portion that extends away from the head. The flexure tail portion is disposed adjacent the actuator body and attaches with the flex cable assembly. The flexure includes conductive traces that extend from adjacent the head and terminate in the flexure tail portion. The flex cable assembly includes a flex cable that connects with the flexure tail portion.

The flexure further includes a dielectric layer and a metal backing layer. The metal backing layer is typically formed of stainless steel. The conductive traces are formed upon the dielectric layer which insulates the traces from electrically shorting via the metal backing layer. The flexure further includes a tongue portion that structurally supports the head. First and second gimbal arms extend between the tongue portion and the flexure body portion. The gimbal arms and the tongue portion are generally referred to as a gimbal of the flexure.

In practice the thermal and hydroscopic expansion coefficients are quite different among the conductive traces, the dielectric layer, and the metal backing layer. Such differences can result in stresses and strains developing within the gimbal of the flexure due to its laminated nature. In this way, the differences in coefficients can lead to increased pitch static attitude (PSA) sensitivity to temperature and humidity changes in the disk drive. As such, it is desirable that the contributions of the conductive traces and dielectric layer to the gimbal stiffness (Kp) be minimized so as to reduce the thermal and hydroscopic effect upon PSA of the flexure.

Prior art gimbal designs have included the use of discrete separated sections of the dielectric layer so as to create discontinuities in the overall laminate flexure structure. This approach has found success in reducing the pitch static attitude (PSA) sensitivity to temperature and humidity changes of the flexure. However, another gimbal design requirement is robustness with regard to ultra-sonic activated aqueous (AQ) cleaning processes. Where multiple discrete sections of the dielectric layer are used, the conductive traces at locations where there are discontinuities between discrete sections of the dielectric layer have been found to be susceptible to damage during such cleaning processes.

As such, there is a need in the art for an improved flexure gimbal design approach with a relatively reduced pitch static attitude (PSA) sensitivity to temperature and humidity changes of the flexure while having adequate structurally robustness with regard to ultra-sonic activated aqueous (AQ) cleaning processes.

SUMMARY

According to an aspect of the present invention, there is provided a head gimbal assembly (HGA) for a disk drive. The HGA includes a slider and a flexure. The flexure includes a flexure body portion, a tongue portion with the slider affixed to the tongue portion, first and second gimbal arms extending between the flexure body portion and the tongue portion, and a dielectric layer including a first dielectric layer segment extending continuously along the first gimbal arm between the flexure body portion and the tongue portion. The flexure further includes a first patterned conductive trace electrically connected to the slider. The first patterned conductive trace is supported by the first dielectric layer segment. The first dielectric layer segment crosses and re-crosses the first patterned conductive trace along the first gimbal arm without overlying the first gimbal arm.

DESCRIPTION OF THE PREFERRED EMBODIMENTS

Figure 1:
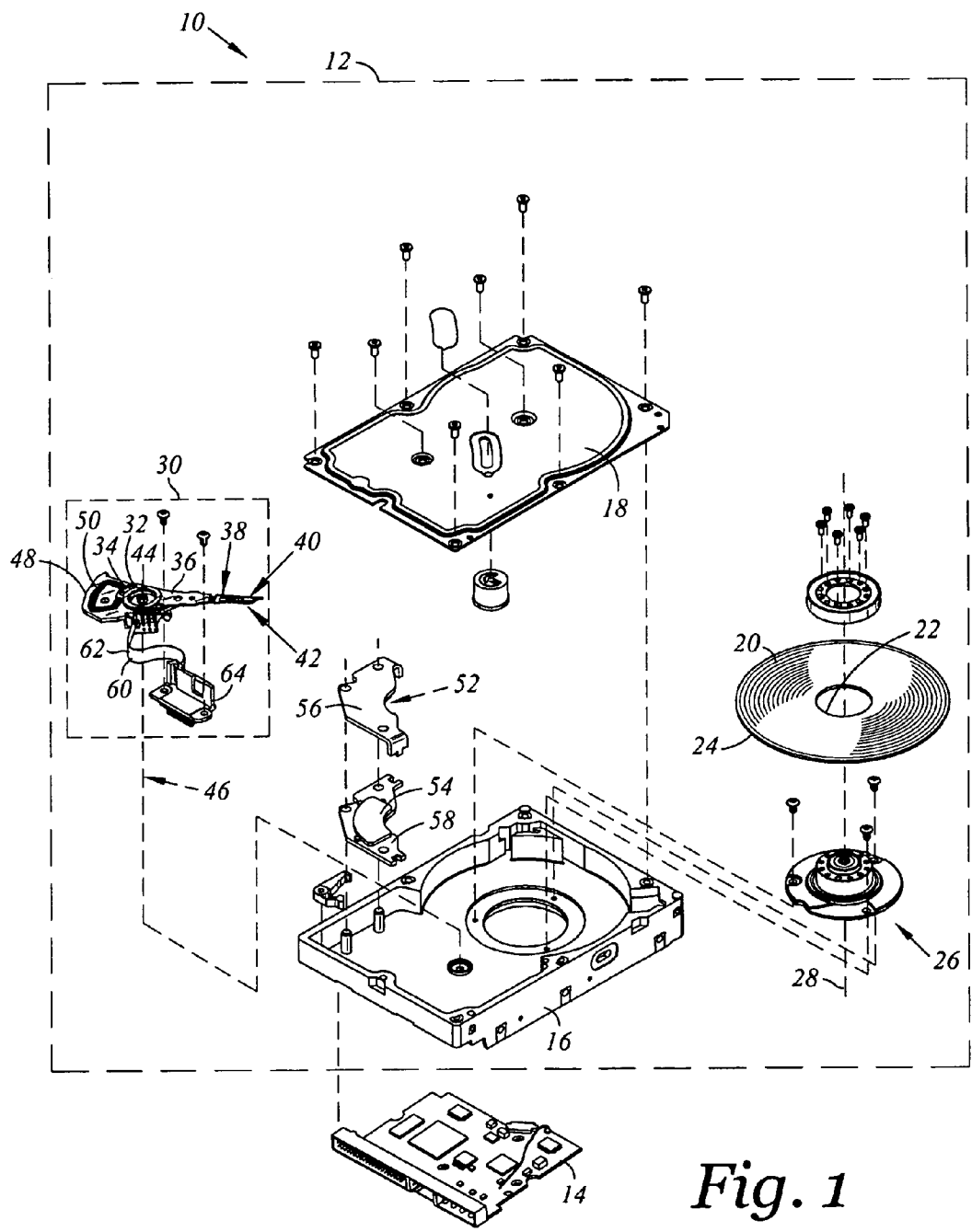
FIG. 1 is an exploded top perspective view of a disk drive capable of including a head gimbal assembly according to an embodiment of the present invention.

Referring now to FIG. 1, there is depicted an exploded perspective view of a disk drive 10 capable of incorporating an embodiment of the present invention (details of which are discussed below and shown in additional figures). The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house a disk 20. A single disk 20 or additional disks may be utilized. The disk 20 includes an inner diameter (ID) 22 and an outer diameter (OD) 24. The disk 20 further includes a plurality of tracks for storing data. The disk 20 may be of a magnetic recording type of storage device, however, other arrangements such as optical recording may be utilized. The head disk assembly 12 further includes a spindle motor 26 for rotating the disk 20 about a disk rotation axis 28. The head disk assembly 12 further includes a head stack assembly (HSA) 30 rotatably attached to the disk drive base 16 in operable communication with the disk 20. The head stack assembly 30 includes an actuator 32.

The actuator 32 includes an actuator body 34 and an actuator arm 36 that extends from the actuator body 34. Distally attached to the actuator arm 36 is a suspension assembly 38. The suspension assembly 38 supports a read head 40. The suspension assembly 38 with the head 40 is referred to as a head gimbal assembly (HGA) 42. It is contemplated that the number of actuator arms and suspension assemblies may vary depending upon the number of disks and disk surfaces utilized.

The read head 40 typically includes a transducer for writing and reading data. Each transducer typically includes a writer and a read element. In magnetic recording applications, the transducer's writer may be of a longitudinal or perpendicular design, and the read element of the transducer may be inductive or magnetoresistive. In optical and magneto-optical recording applications, the head 40 may also include an objective lens and an active or passive mechanism for controlling the separation of the objective lens from a disk surface of the disk 20. The disk 20 includes opposing disk surfaces. In magnetic recording applications the disk surface typically includes one or more magnetic layers. Data may be recorded along data annular regions on a single disk surface or both.

The head stack assembly 30 may be pivoted such that the head 40 is disposed adjacent to the various data annular regions from adjacent to the outer diameter 24 to the inner diameter 22 of the disk 20. Shown is a conventional "rotary" or "swing-type" actuator assembly. In this embodiment the actuator body 34 includes a bore, and the actuator 32 further includes a pivot bearing cartridge 44 engaged within the bore for facilitating the actuator body 34 to rotate between limited positions about an axis of rotation 46.

The actuator 32 further includes a coil support element 48 that extends from one side of the actuator body 34 opposite the actuator arms 36. The coil support element 48 is configured to support a coil 50. First and second magnets 52, 54 are supported by first and second magnet supports 56, 58 which are attached to the disk drive base 16 (the first magnet 52 is denoted in dashed lining and it is understood that it is disposed at an underside of the first magnet support 56). The coil 50 interacts with the first and second magnets 52, 54 to form a voice coil motor for controllably rotating the actuator 32. The printed circuit board assembly 14 includes a servo control system in the form of a disk controller for generating servo control signals. These servo control signals take the form of current passing through the coil 50 that results in a torque being applied to the actuator 32. The head stack assembly 30 further includes a flex cable assembly 60. The flex cable assembly 60 includes a flex cable 62 and a cable connector 64. The cable connector 64 is attached to the disk drive base 16 and is disposed in electrical communication with the printed circuit board assembly 14. The flex cable assembly 60 supplies current to the coil 46 and carries signals between the head 40 and the printed circuit board assembly 14.

Figure 2:
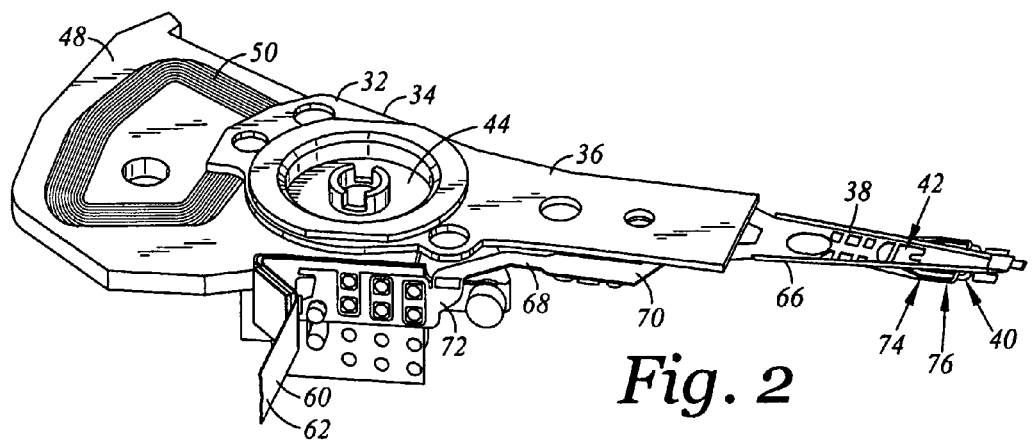
FIG. 2 is an enlarged top perspective view of a head stack assembly that includes a head gimbal assembly according to an embodiment of the present invention.
Figure 3:
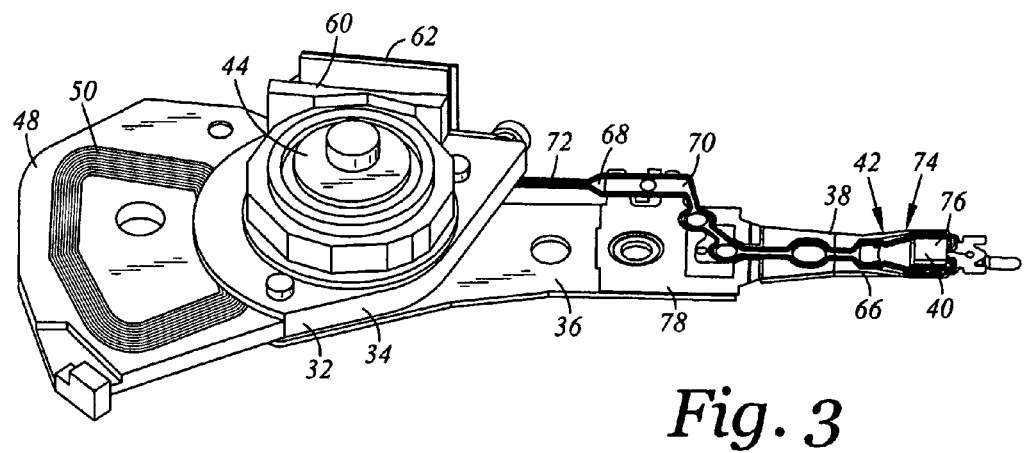
FIG. 3 is an enlarged bottom perspective view of the head stack assembly of FIG. 2.

Referring additionally to FIG. 2, there is depicted an enlarged top perspective view of a head stack assembly 30 according to an embodiment of the present invention. FIG. 3 is an enlarged bottom perspective view of the head stack assembly 30 of FIG. 2. In the embodiment shown, the suspension assembly 38 includes a load beam 66. The load beam 66 is coupled to the actuator arm 36 with the load beam 66 extending distally from the actuator arm 36. The load beam 66 includes a bend area of the load beam 66 that makes the load beam 66 compliant in a direction normal to the disk 20 to allow an air bearing to position the head 40 at a desired fly height above a surface of the disk 20. The bend area of the load beam 66 is initially plastically deformed through a macroscopic angle so that when it is elastically straightened during disk drive assembly it can provide a pre-load force upon the head 40 against the disk 20. The pre-load force is commonly referred to as a "gram load" because it is typically measured in grams.

A flexure 68 is electrically connected to the flex cable 62. As shown in FIG. 3, the flexure 68 is overlaid on the actuator arm 36 and the distally extending load beam 66. The flexure 68 may be referred to as a trace assembly or a trace suspension assembly. The flexure 68 extends along the actuator arm 36 and the load beam 66. The head 40 is affixed to and electrically connected to the flexure 68.

Figure 4:
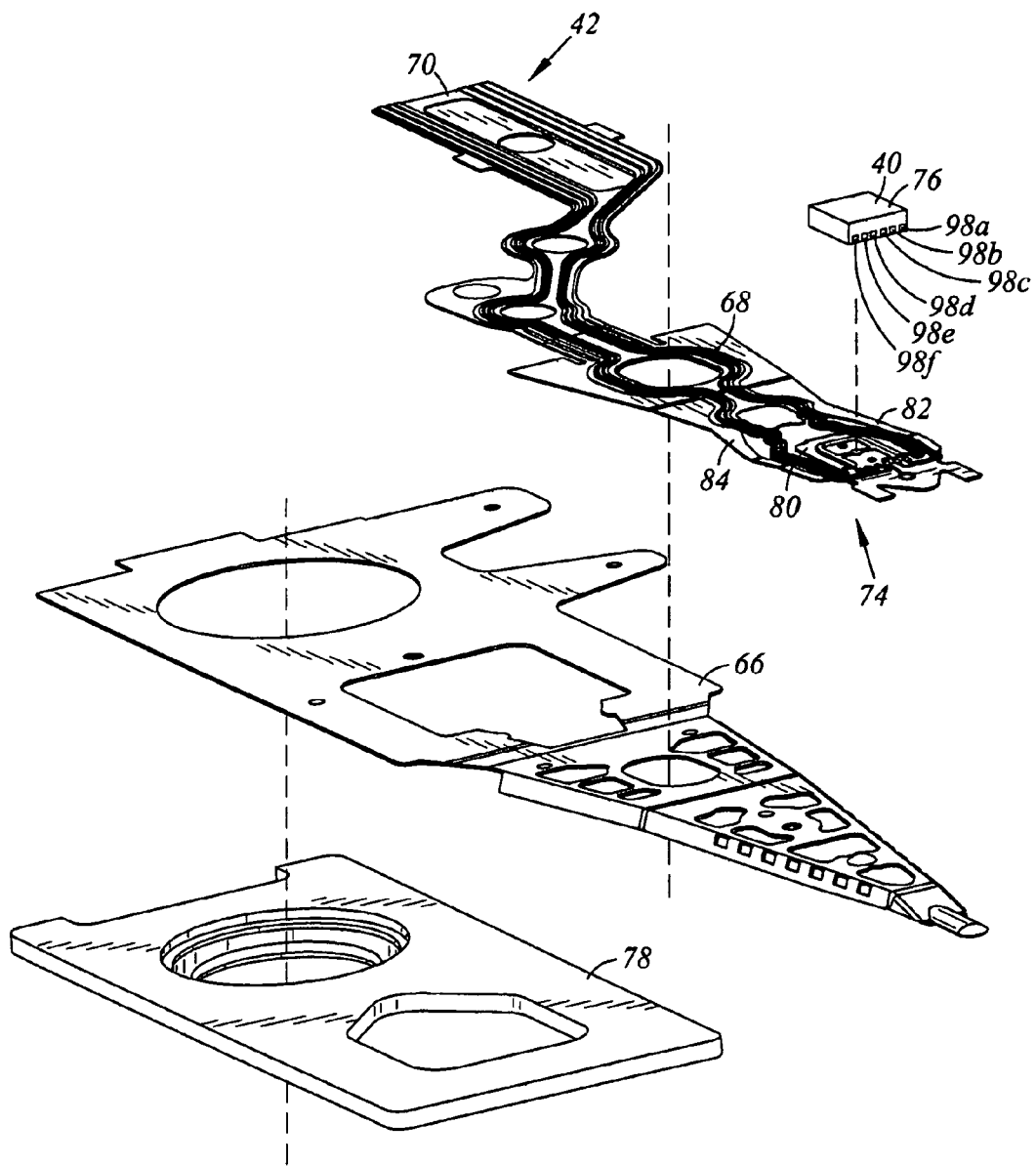
FIG. 4 is an exploded enlarged perspective view of a portion of the head stack assembly of FIG. 2.
Figure 5:
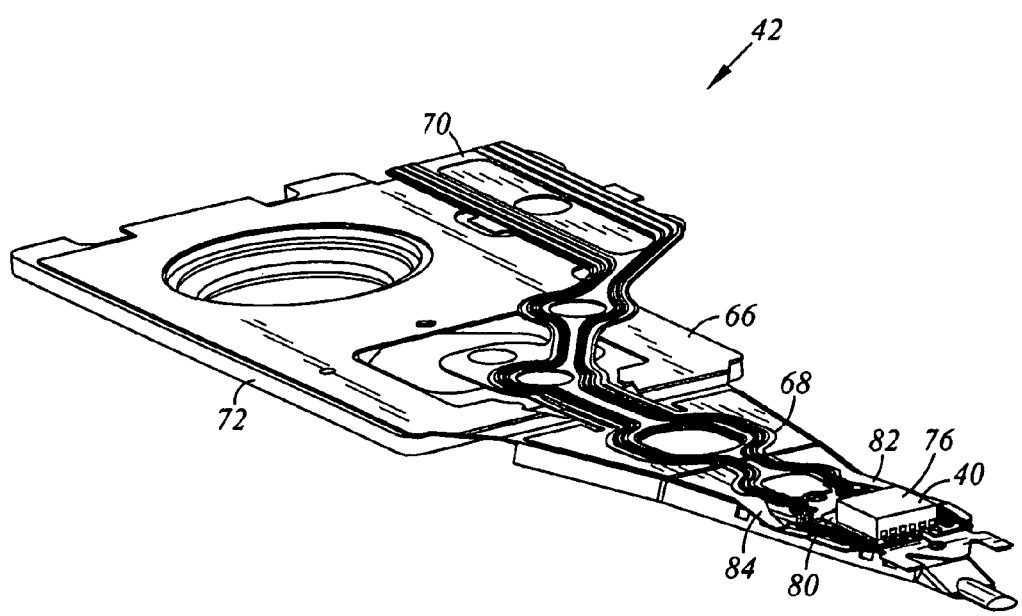
FIG. 5 is the portion of the head stack assembly of FIG. 4 as assembled.

Referring additionally to FIG. 4, there is depicted an exploded enlarged perspective view of a portion of the head stack assembly 30 of FIG. 2. FIG. 5 is the portion of the head stack assembly 30 of FIG. 4 as assembled. The flexure 68 includes a flexure body portion 70 with a flexure tail portion 72 that is opposite a gimbal end 74. The flexure tail portion 72 is disposed adjacent the actuator body 34. The flex cable 62 and the flexure tail portion 72 are electrically and mechanically connected to each other. Though not shown, a pre-amp may additionally be provided adjacent the flexure tail portion 72 at the interface with the flex cable 62. The head 40 includes a slider 76 and the transducer disposed on the slider 76. The gimbal end 74 is used to structurally support the slider 76 and to electrically connect with the electrical components of the transducer of the head 40.

The head stack assembly 30 further includes a base plate 78. The base plate 78 may be used to swage attach the load beam 66 to an end of the actuator arm 36. The base plate 78 may be disposed between the load beam 66 and the actuator arm 36. The flexure 68 is disposed upon the load beam 66.

Figure 6:
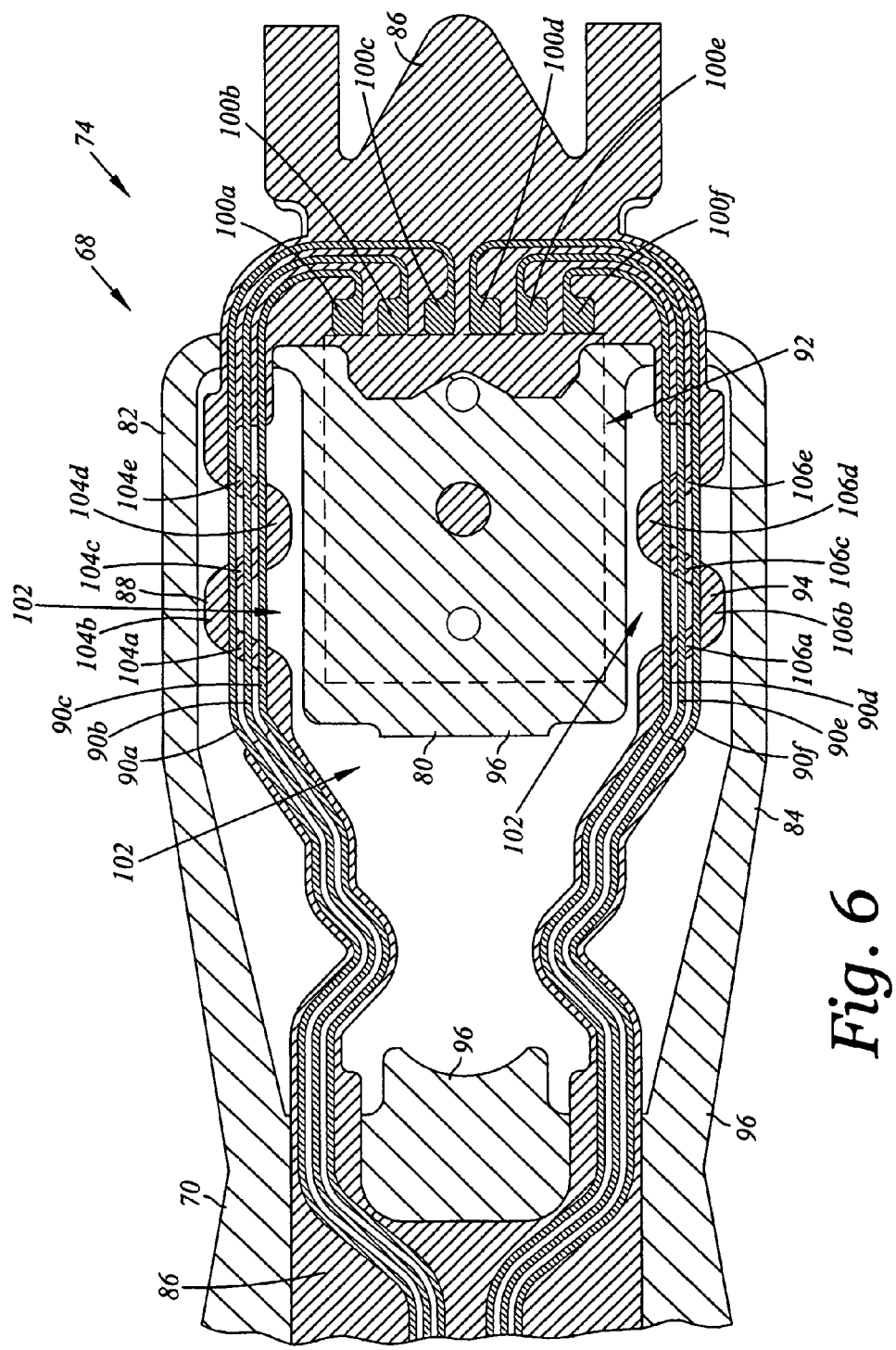
FIG. 6 is an enlarged top plan view of a portion a flexure according to an embodiment of the present invention, with a slider periphery indicated in dashed lining.

Referring additionally to FIG. 6, there is depicted an enlarged top plan view of a portion of a head gimbal assembly 42 according to an embodiment of the present invention, with a portion of the flexure 68 shown. In the embodiment shown, there is provided the head gimbal assembly 42 for the disk drive 10. The head gimbal assembly 42 includes the slider 76 and the flexure 68. The flexure 68 includes the flexure body portion 70, a tongue portion 80 with the slider 76 being attached to the tongue portion 80, and first and second gimbal arms 82, 84 extending between the flexure body portion 70 and the tongue portion 80. The flexure 68 further includes a dielectric layer 86 including a first dielectric layer segment 88 extending continuously along the first gimbal arm 82 between the flexure body portion 70 and the tongue portion 80. The flexure 68 further includes a patterned conductive trace 90a electrically connected to the slider 76. The patterned conductive trace 90a is supported by the first dielectric layer segment 88. The first dielectric layer segment 88 crosses and re-crosses the first patterned conductive trace 90a along the first gimbal arm 82 without overlying the first gimbal arm 82.

For ease of illustration, the slider 76 is not shown in FIG. 6. However, a slider periphery 92 is shown to indicate the installed location of the slider 76. An adhesive compound, such as a structural epoxy, may be used for secure attachment of the slider 76 to the tongue portion 80.

According to various embodiments, the flexure 68 may further include additional patterned conductive traces 90b-f. The patterned conductive traces 90b-c may be supported by the first dielectric layer segment 88. The first dielectric layer segment 88 crosses and re-crosses the patterned conductive traces 90b-c along the first gimbal arm 82 without overlying the first gimbal arm 82. The dielectric layer 86 may further include a second dielectric layer segment 94 extending continuously along the second gimbal arm 84 between the flexure body portion 70 and the tongue portion 80. The patterned conductive traces 90d-f may be supported by the second dielectric layer segment 94. The second dielectric layer segment 94 crosses and re-crosses the patterned conductive traces 90d-f along the second gimbal arm 84 without overlying the second gimbal arm 84.

The tongue portion 80 and the first and second gimbal arms 82, 84 may be generally referred to as a gimbal. The first and second gimbal arms 82, 84 provide angular compliance to the head 40 to allow the head 40 to follow undulations of the surface of the rotating disk 20.

The flexure 68 further may include a metal backing layer 96. The metal backing layer 96 may be included within the tongue portion 80 and the first and second gimbal arms 82, 84. The dielectric layer 86 may be disposed between the metal backing layer 96 and the conductive traces 90a-f such as shown. The metal backing layer 96 may be stainless steel, for example. In this regard, the metal backing layer 96 may be used to provide structural support for the dielectric layer 86, the conductive traces 90a-f, and the slider 76.

It is contemplated that the metal backing layer 96 may be attached to an electrical ground. For example, the metal backing layer 96 may be in electrical communication with other components of the head gimbal assembly 42, such as the load beam 66 or the base plate 78. The load beam 66 is joined with the base plate 78 which is attached to the actuator arm 36. The actuator arm 36 may be disposed in electrical communication with the disk drive base 16 via the pivot bearing cartridge 44, and thus is considered to be an electrical ground.

The dielectric layer 86 may be formed of various insulative materials, such as polyimide. The dielectric layer 86 may serve to electrically insulate the conductive traces 90 from electrically shorting with the metal backing layer 96.

In the embodiment shown in FIG. 4, the slider 76 may include electrically conductive pads 98a-f disposed upon a trailing side of the slider 76. As shown in FIG. 6, the patterned conductive traces 90a-f may respectively terminate at connection terminals 100a-f disposed at the tongue portion 80. The electrically conductive pads 98a-f may be electrically connected to the patterned conductive traces 90a-f according to any of those methods that are well known to one of ordinary skill in the art. For example, gold ball bonds (not shown) may be used to electrically connect the electrically conductive pads 98a-f to the patterned conductive traces 90a-f.

As mentioned above there are provided the patterned conductive traces 90a-f. Various deposition, screening and/or etching techniques may be utilized to form the traces 90a-f upon the dielectric layer 92, however the conductive traces 90a-f would not be fabricated from discrete insulated wiring.

The conductive traces 90a-f preferably comprise a low electrical resistivity metal, such as copper.

In the depicted exemplary embodiment, the flexure 68 includes a gimbal opening 102 disposed between the first gimbal arm 82 and the tongue portion 80 and between the second gimbal arm 84 and the tongue portion 80. The patterned conductive traces 90a-c extend over the gimbal opening 102 where the first dielectric layer segment 88 crosses and re-crosses the patterned conductive traces 90a-c. The patterned conductive traces 90d-f extend over the gimbal opening 102 where the second dielectric layer segment 94 crosses and re-crosses the patterned conductive traces 90d-f.

In the embodiment shown in FIG. 6, the first dielectric layer segment 88 includes dielectric layer sections 104a-e. In this plan view, the dielectric layer section 104a is shown crossing the patterned conductive traces 90a-c. In this view moving to the right, the dielectric layer section 104a continues into the dielectric layer section 104b that is positioned outside of the patterned conductive traces 90a-c with regard to the tongue portion 80. Further in this view moving to the right, the dielectric layer section 104b continues into the dielectric layer section 104c that re-crosses the patterned conductive traces 90a-c by traversing the patterned conductive traces 90a-c downward and to the right. The dielectric layer section 104c continues into the dielectric layer section 104d that is positioned inside of the patterned conductive traces 90a-c with regard to the tongue portion 80. Further in this view moving to the right, the dielectric layer section 104d continues into the dielectric layer section 104e that again re-crosses the patterned conductive traces 90a-c by traversing the patterned conductive traces 90a-c upward and to the right.

It is noted that the first dielectric layer segment 88 does not overlie the first gimbal arm 82 where the first dielectric layer segment 88 crosses and re-crosses the patterned conductive traces 90a-c. Thus, in the regions of the dielectric layer sections 104a-c or the dielectric layer sections 104c-e the first dielectric layer segment 88 is separated from the first gimbal arm 82 as seen in the plan view of FIG. 6. Such configuration is sometimes referred to as a "flying lead" configuration because there is no direct support from the first gimbal arm 82 in such region over the gimbal opening 102. Further, it is noted that the first dielectric layer segment 88 extends continuously along the first gimbal arm 82 between the flexure body portion 70 and the tongue portion 80.

Similarly, the second dielectric layer segment 94 includes dielectric layer sections 106a-e that facilitate the crossing, re-crossing and further re-crossing of the patterned conductive traces 90d-f. The second dielectric layer segment 94 does not overlie the second gimbal arm 84 where the second dielectric layer segment 94 crosses and re-crosses the patterned conductive traces 90d-f. The second dielectric layer segment 94 extends continuously along the second gimbal arm 84 between the flexure body portion 70 and the tongue portion 80.

In this embodiment, the patterned conductive traces 90a-f are relatively straight in the region respectively where the first and second dielectric layer segments 88, 94 cross and re-cross the patterned conductive traces 90a-f.

By configuring the first and second dielectric layer segments 88, 94 to respectively cross and re-cross the patterned conductive traces 90a-f, this effectively lengthens the first and second dielectric layer segments 88, 94 in comparison to the patterned conductive traces 90a-f. This tends to mitigate thermal expansion effects due to differing coefficients of thermal expansion between the dielectric layer 86 and the patterned conductive traces 90a-f. This tends to make the first and second dielectric layer segments 88, 94 relatively more compliant with regard to flexure of the first and second gimbal arms 82, 84 and the tongue portion 80.

Moreover, because each of the first and second dielectric layer segments 88, 94 extends continuously along the first and second gimbal arms 82, 84 between the flexure body portion 70 and the tongue portion 80, the first and second dielectric layer segments 88, 94 provide a continuity of structural support for the patterned conductive traces 90a-f. This is particularly usefully when being subjected to high vibration environments, such as during ultrasonic cleaning processes.

Figure 7:
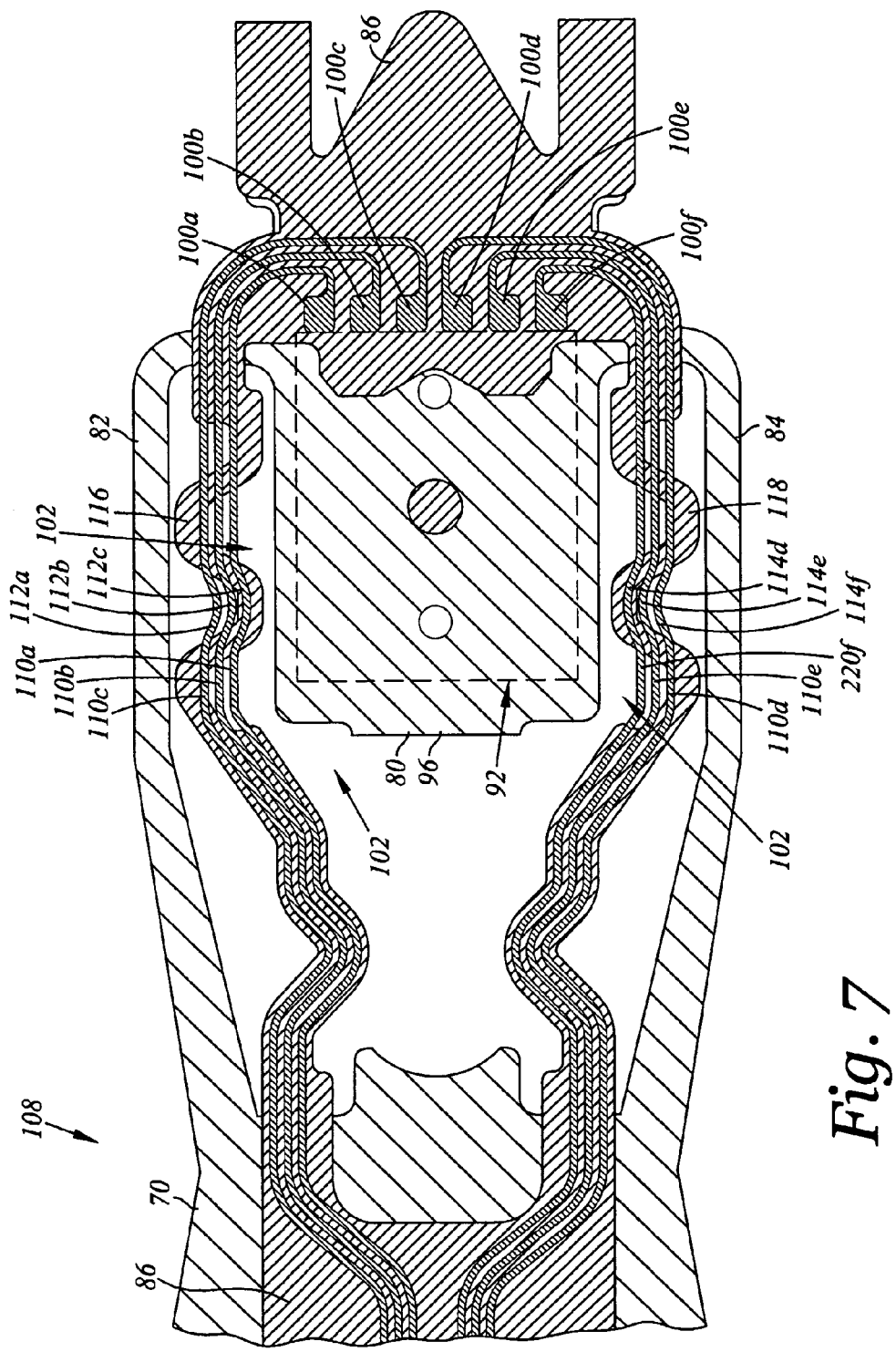
FIG. 7 is an enlarged top plan view of a portion of a flexure according to another embodiment.

Referring now to FIG. 7, there is depicted another embodiment. Similar reference numerals as those in relation to the embodiments shown in FIGS. 1-6 are used to indicate similarly configured components, however, with those differences as noted below. FIG. 7 depicts a perspective view similar to a portion of the flexure 68 of FIG. 6. However, in this embodiment, there is depicted a flexure 108 that includes patterned conductive traces 110a-f. In this embodiment the patterned conductive traces 110a-f respectively include curved sections 112a-c, 114a-c. The patterned conductive traces 110a-f are respectively supported by first and second dielectric layer segments 116, 118. The first and second dielectric layer segments 116, 118 respectively cross and re-cross the patterned conductive traces 110a-f. The curved sections 112a-c, 114a-c of the patterned conductive traces 110a-f are located between where the first and second dielectric layer segments 116, 118 crosses and re-crosses the patterned conductive traces 110a-f. It is contemplated that the curved natures of the curved sections 112a-c, 114a-c allow the patterned conductive traces 110a-f to be somewhat compliant in such region while still maintaining structural integrity. As such the patterned conductive traces 110a-f may undergo a degree of lengthening in a direction along the flexure 108 with similar changes of length of the first and second dielectric layer segments 116, 118 in such region during flexure of the first and second gimbal arms 82, 84 and the tongue portion 80.

Figure 8:
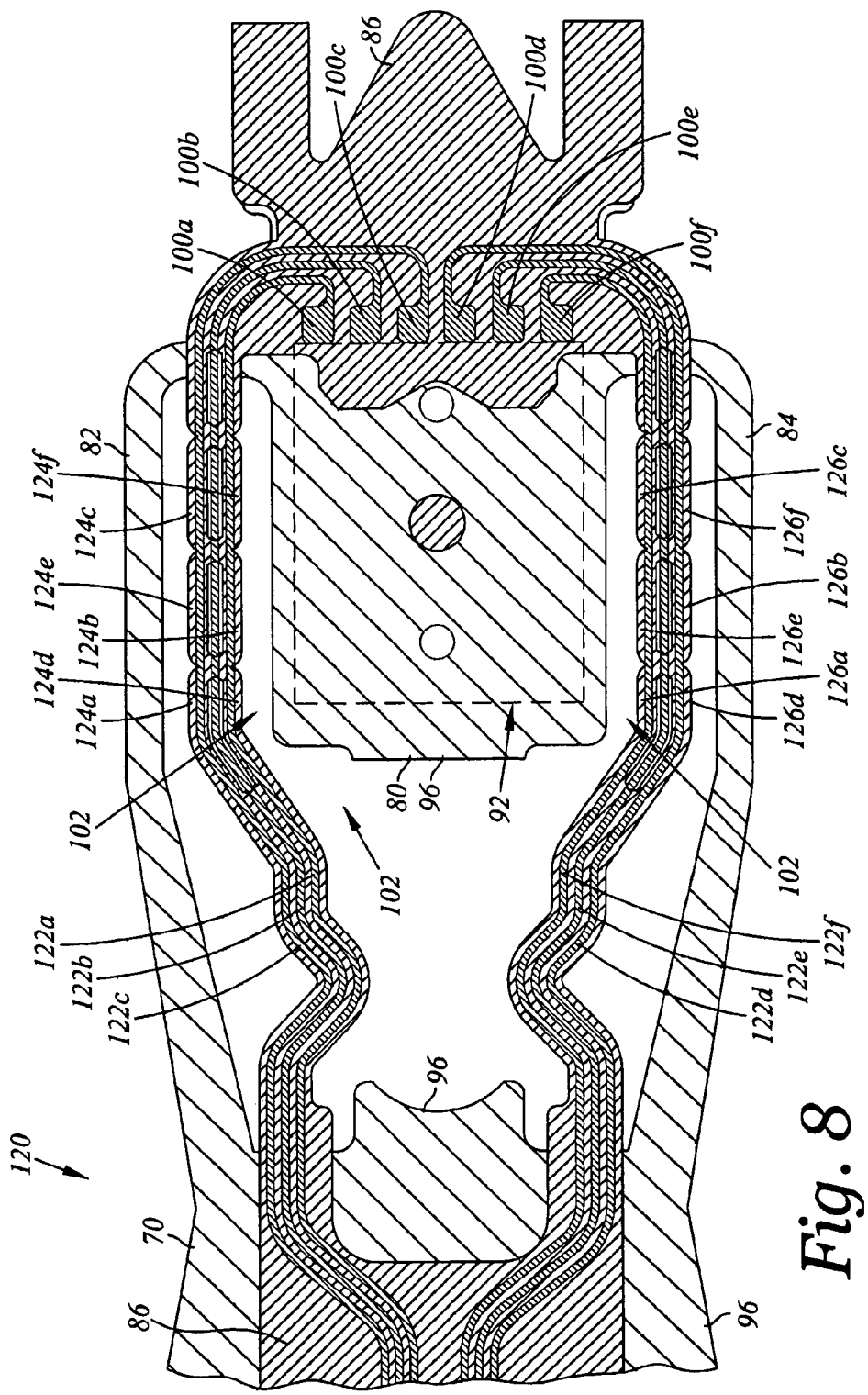
FIG. 8 is an enlarged top plan view of a portion of a flexure according to another embodiment.

Referring now to FIG. 8, there is depicted another embodiment. Similar reference numerals as those in relation to the embodiments shown in FIGS. 1-6 are used to indicate similarly configured components, however, with those differences as noted below. FIG. 8 depicts a perspective view similar to a portion of the flexure 68 of FIG. 6. However, in this embodiment, there is depicted a flexure 120 that includes patterned conductive traces 122a-f. The dielectric layer 86 includes dielectric layer sections 124a-f, 126a-f.

The dielectric layer sections 124a-f, 126a-f support the patterned conductive traces 122a-f over the gimbal opening 102. As is shown, the dielectric layer sections 124a-f, 126a-f are configured in a weaving pattern as such dielectric layer sections 124a-f, 126a-f facilitate a multiplicity of crossing and re-crossing of the patterned conductive traces 122a-f. In this regard, the dielectric layer sections 124a-f, 126a-f provide a comprehensive support structure for the patterned conductive traces 122a-f while effectively lengthening the dielectric layer 86 in such region.

Figure 9:
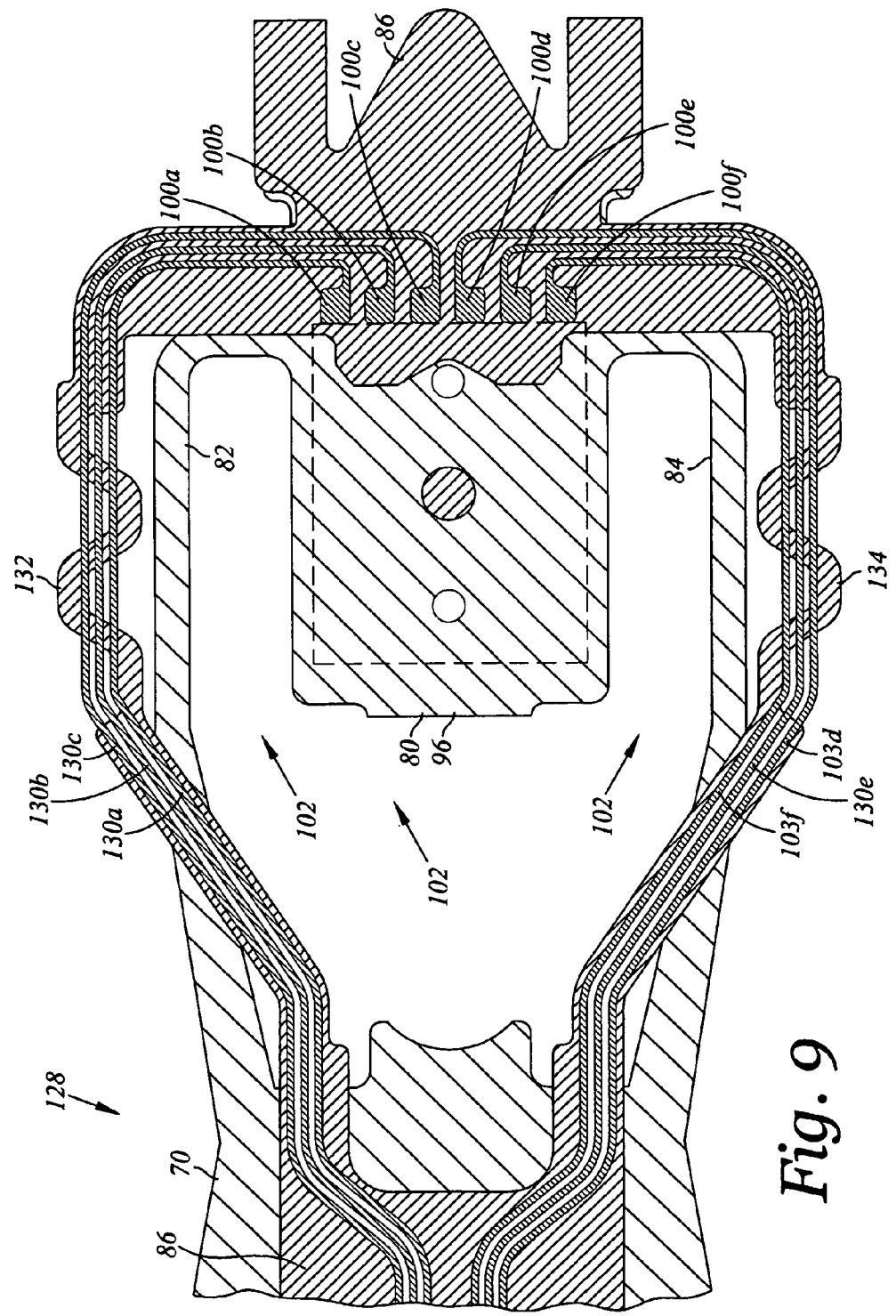
FIG. 9 is an enlarged top plan view of a portion of a flexure according to another embodiment.

Referring now to FIG. 9, there is depicted another embodiment. Similar reference numerals as those in relation to the embodiments shown in FIGS. 1-6 are used to indicate similarly configured components, however, with those differences as noted below. FIG. 9 depicts a perspective view similar to a portion of the flexure 68 of FIG. 6. However, in this embodiment, there is depicted a flexure 128 that includes patterned conductive traces 130a-f that are respectively supported by first and second dielectric layer segments 132, 134. In this embodiment, the first and second dielectric layer segments 132, 134 are routed to an outside positioning with regard to the first and second gimbal arms 82, 84. The first gimbal arm 82 is disposed between the patterned conductive traces 130a-c and the gimbal opening 102 where the first dielectric layer segment 132 crosses and re-crosses the patterned conductive traces 130a-c. The second gimbal arm 84 is disposed between the patterned conductive traces 130d-f and the gimbal opening 102 where the second dielectric layer segment 134 crosses and re-crosses the patterned conductive traces 130d-f. It is contemplated that this outside routing may be implemented in any of dielectric layer segment and trace crossing and re-crossing embodiments described herein.

What is claimed is:

1. A head gimbal assembly (HGA) for a disk drive, the HGA comprising:
    a slider; and
    a flexure including:
        a flexure body portion;
        a tongue portion with the slider affixed to the tongue portion;
        first and second gimbal arms extending between the flexure body portion and the tongue portion;
        a dielectric layer including a first dielectric layer segment extending continuously along the first gimbal arm between the flexure body portion and the tongue portion; and
        a first patterned conductive trace electrically connected to the slider, the first patterned conductive trace being supported by the first dielectric layer segment;
        wherein the first dielectric layer segment crosses and re-crosses the first patterned conductive trace along the first gimbal arm without overlying the first gimbal arm.

2. The HGA of claim 1 wherein the flexure includes a gimbal opening disposed between the first gimbal arm and the tongue portion and between the second gimbal arm and the tongue portion, the first patterned conductive trace extending over the gimbal opening where the first dielectric layer segment crosses and re-crosses the first patterned conductive trace.

3. The HGA of claim 1 wherein the flexure includes a gimbal opening disposed between the first gimbal arm and the tongue portion, the first gimbal arm being disposed between the first patterned conductive trace and the gimbal opening where the first dielectric layer segment crosses and re-crosses the first patterned conductive trace.

4. The HGA of claim 1 wherein the first patterned conductive trace is generally straight between where the first dielectric layer segment crosses and re-crosses the first patterned conductive trace.

5. The HGA of claim 1 wherein the first patterned conductive trace is curved between where the first dielectric layer segment crosses and re-crosses the first patterned conductive trace.

6. The HGA of claim 1 wherein the dielectric layer includes a second dielectric layer segment extending continuously along the second gimbal arm between the flexure body portion and the tongue portion, the flexure further including a second patterned conductive trace electrically connected to the slider, the second patterned conductive trace being supported by the second dielectric layer segment, the second dielectric layer segment crossing and re-crossing the second patterned conductive trace along the second gimbal arm without overlying the second gimbal arm.

7. The HGA of claim 1 wherein the dielectric layer comprises polyimide.

8. The HGA of claim 1 wherein the flexure includes a metal backing layer, the metal backing layer being included within the gimbal arms.

9. The HGA of claim 8 wherein the metal backing layer comprises stainless steel.

\* \* \* \* \*